(Model.) 4 Sheets—Sheet 1.
W. W. BURSON.
CORD KNOTTING APPARATUS FOR GRAIN BINDERS.
No. 273,812. Patented Mar. 13, 1883.

Figure 1:
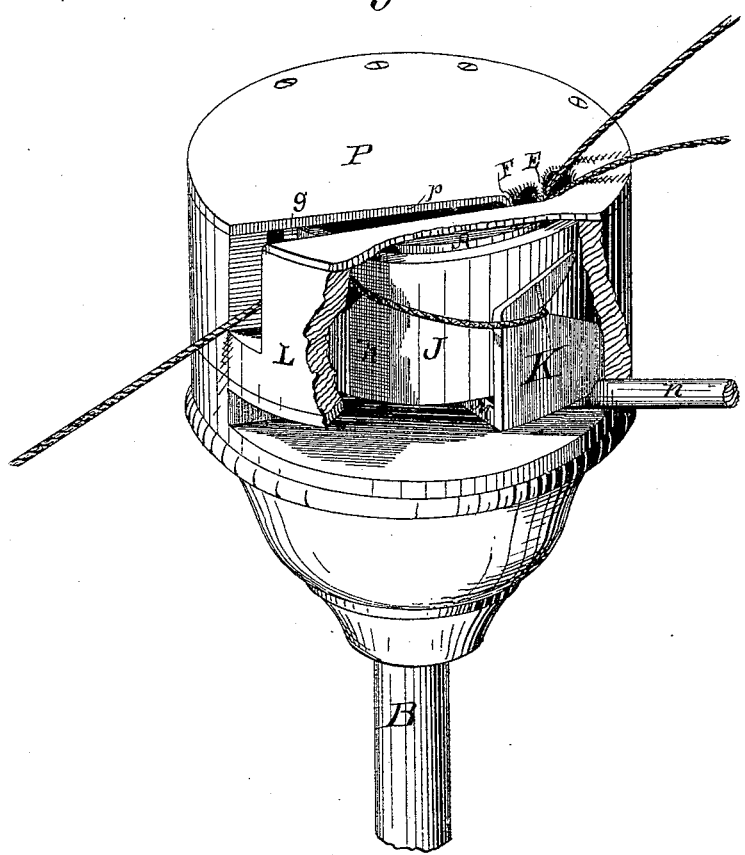

(Model.)
4 Sheets—Sheet 2.
W. W. BURSON.
CORD KNOTTING APPARATUS FOR GRAIN BINDERS.
No. 273,812. Patented Mar. 13, 1883.
Fig. 1.ª
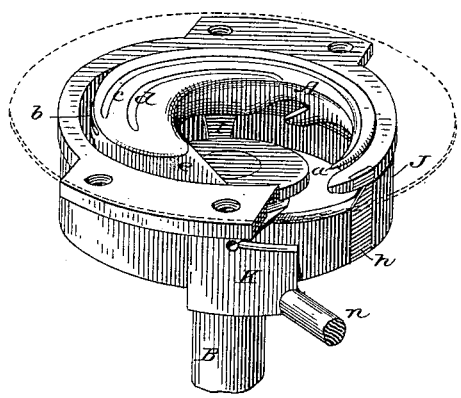
Fig. 2.
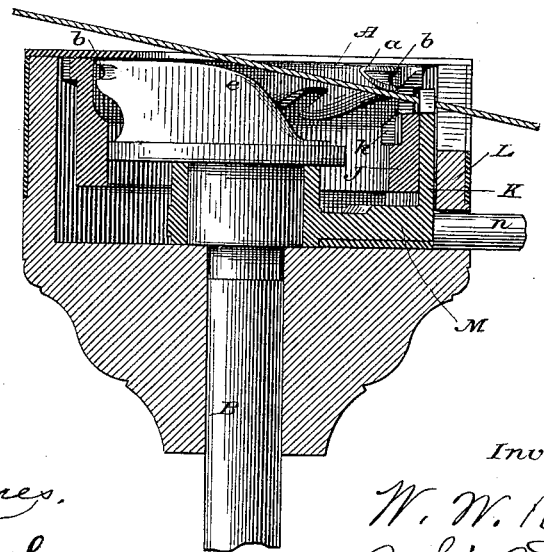
Attest:
R. F. Barnes.
D. P. Cowl
Inventor:
W. W. Burson
By his Atty
R. D. O. Smith (Model.)
W. W. BURSON.
CORD KNOTTING APPARATUS FOR GRAIN BINDERS.
No. 273,812. Patented Mar. 13, 1883.
4 Sheets—Sheet 3.
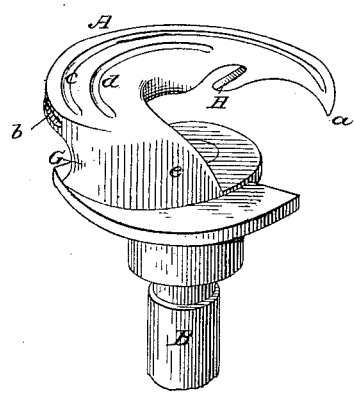
Fig. 3.
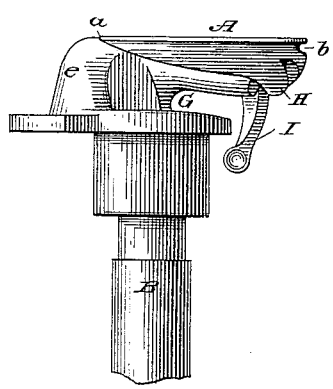
Fig. 4.
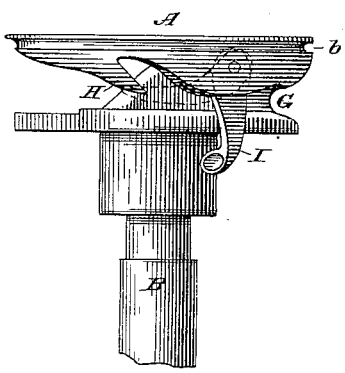
Fig. 5.
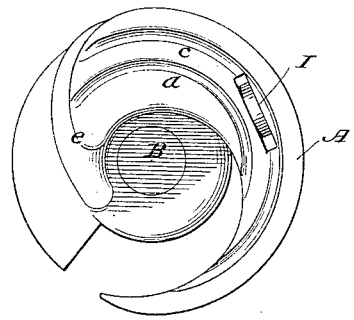
Fig. 6.
Fig. 7.
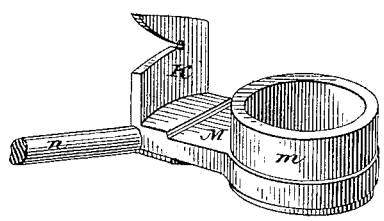
Fig. 8.
Attest:
R. F. Barney
D. P. Cowl
Inventor:
W. W. Burson
By his atty
R. W. O. Smith (Model.)

4 Sheets—Sheet 4.

W. W. BURSON.
CORD KNOTTING APPARATUS FOR GRAIN BINDERS.

No. 273,812.        Patented Mar. 13, 1883.

Attest:
R. F. Barnes.
D. P. Howl

Inventor:
W. W. Burson
By his Atty
R. D. O. Smith

United States Patent Office.

WILLIAM W. BURSON, OF ROCKFORD, ILLINOIS.

CORD-KNOTTING APPARATUS FOR GRAIN-BINDERS.

SPECIFICATION forming part of Letters Patent No. 273,812, dated March 13, 1883.

Application filed May 28, 1880. (Model.)

*To all whom it may concern:*

Be it known that I, WILLIAM WORTH BURSON, of Rockford, Winnebago county, Illinois, have invented a new and useful Improvement on Cord-Knotting Apparatus Applicable to Automatic Grain-Binders, and for other purposes; and I do hereby declare that the following is a full and complete description of the same.

The devices whereby the material to be bound is gathered in a bundle and the cord placed around the same are not shown nor described, because they are not material to the operation of the devices whereby the ends of the band are knotted together, and it is to be understood, therefore, that the knotting apparatus shown and described herein is capable of use with any mechanism capable of placing the material to be knotted properly in the knotter.

My knotter belongs to that class wherein a hook curved in a plane perpendicular to the axis of rotation is employed to effect the formation of a loop or bight of the cord through which the end or ends of the same are drawn by a backward rotation of said hook to form the knot; and it consists, first, in a knotting-hook curved in a plane perpendicular to its axis of rotation concealed behind a plate parallel with said hook and provided with a transverse slot, through which the cord may enter to be engaged by the hook; second, in a structure of said hook which facilitates the turning of the cord from the lower to the upper side of the same; third, in a switch or clasp on the lower side to prevent an improper engagement of the loop with the secondary hook, whereby the cord ends are held; fourth, in the grooves in the edge and face of the hook wherein the stripping-pins are concealed, to arrest the loop on the backward motion of the looping-hook; fifth, in the configuration of the supplemental or holding hook.

That others may fully understand my invention, I will particularly describe the same, having reference to the accompanying drawings, wherein—

Figure 9:
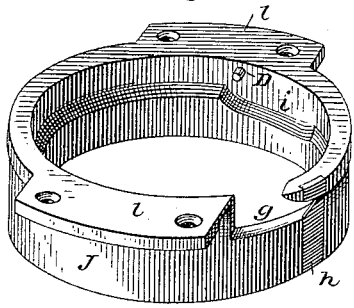
Figure 10:
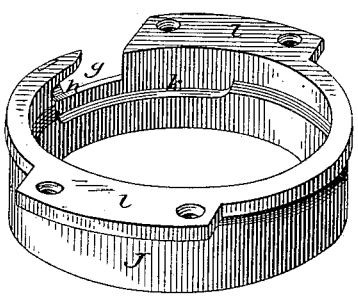
Figure 11:
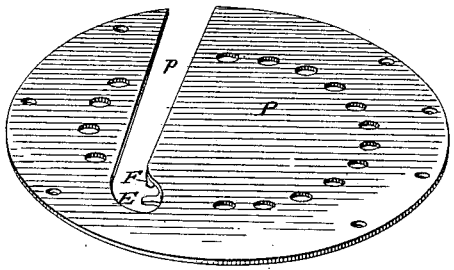
Figure 12:
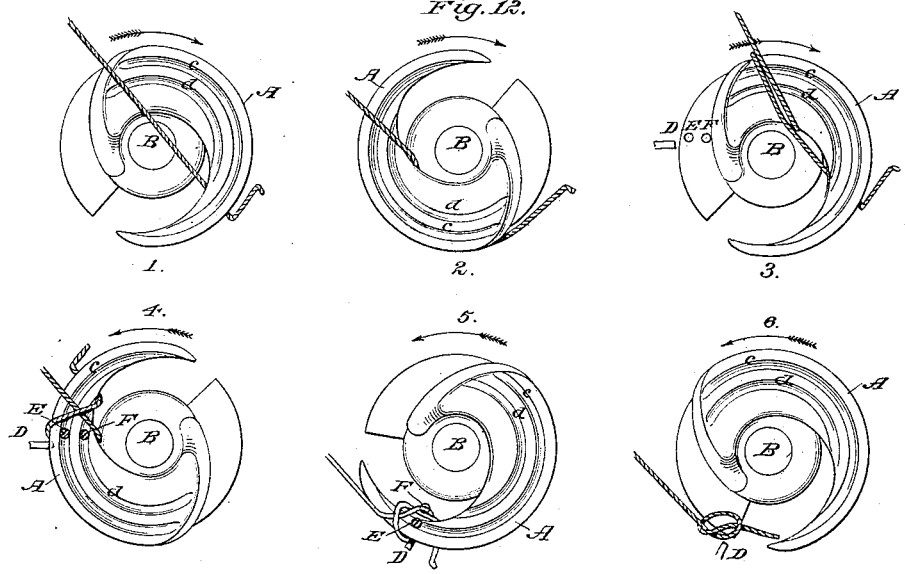

Figure 1 is a perspective sectional view of my apparatus in initial position. Fig. 1ᵃ is a perspective view of my device in operative position. Fig. 2 is a central sectional elevation of the same, showing the initial position of the cord. Fig. 3 is a perspective of the rotating knotting-hook detached. Fig. 4 is an elevation of the same one-fourth revolution from the position in Fig. 3. Fig. 5 is an elevation of the same one-half turn from Fig. 3. Fig. 6 is a top plan of the knotting-hook. Fig. 7 is a bottom plan of the same. Fig. 8 is a perspective of the holding-hook detached. Fig. 9 is a perspective of the metallic frame or socket in which the knotting-hook works. Fig. 10 is a perspective of the same one-half turn from Fig. 9. Fig. 11 is a perspective of the slotted top or cover-plate. Fig. 12 represents in six diagrams the operation of forming the knot.

A is the knotting-hook, mounted upon shaft B, and with its upper surface in a plane perpendicular to the axis of said shaft. The outer edge of the hook A is the segment of a circle whose center is coincident with the axis of shaft B, and the inner edge of said hook is a volute bisecting the circle at the pointed extremity of the hook A.

In the periphery or edge of the hook A there is a deep groove, $b$, and upon the face of said hook there are grooves $c\ d$, concentric to the center of the shaft B. These grooves are severally adapted to receive and conceal the ends of the strippers D E F, which project from the adjacent stationary surface of the surrounding case, and when the hook A is revolving backward they arrest the loops of cord and strip them from the hook, and thus discharge the knot from said hook.

The base of the hook A is supported upon the concave or hollow neck G, into which the cord glides as it is formed in a loop around the hook, as shown in diagram 2 of Fig. 12. The upper surface, $e$, of the base of the hook A is made sloping and smooth, so that the loop of the cord will readily slip from position 2 to position 3 of Fig. 12.

In the under side of the hook A, and a distance from the extremity $a$ equal to about one-fourth the periphery, there is a notch, H, making a supplementary hook, the obliquity whereof is forward or toward the point $a$, so that while said point $a$ is advancing in its rotation the cord will readily pass the notch H, but when said point $a$ is retracting, then the cord will pass into and be confined by said notch. The inner angle of said notch is very acute, so as to grip and confine the cord.

Behind the notch H there is a pivoted switch or clasp, I, which is free to swing forward or backward to let the cord pass it. When turned forward it covers and bridges the notch H, so that the cord will pass under and not into said notch. Power to rotate the hook is derived from any proper and competent source, and is applied to the shaft B.

Surrounding the rotating hook A there is a circular frame, J, the inner surface whereof is of slightly greater radius than the hook A, and the upper surface of said frame is slightly above the face of said hook A. At one side there is a perpendicular notch, $g$, cut in the edge of the frame J, and on one side said notch is undercut and provided with a stationary oblique-edged cutter, $h$.

At a point distant from the cutter $h$, about one-fourth the perimeter, there is permanently set a pin, D, which projects into the groove $b$ in the edge of the hook A, and in the vicinity of said pin the inner surface of the frame J is cut away or chambered, as at $i$, so that the cord will not be jammed and the movement of the hook clogged when the cord is arrested by said pin. For the same reason the inner surface of J is cut away and chambered, also, at $k$, in the vicinity of the cutter $h$. The frame J is provided with laterally-projecting ears $l$, for its attachment to the supporting exterior frame; but the particular method of attachment and support of said frame is immaterial.

A holding-hook, K, is arranged to move along the outer surface of the frame J, and seize the cord when it is presented in the notch $g$, and jam the same against an exterior stationary part, which may be the exterior supporting-frame L, or it may be a plate placed there for that purpose only. The movement of the holding-hook is made sufficient to draw out enough cord so that in the act of tying the knot it can be paid back, so as to avoid undue strain upon the cord. The front edge of the holding-hook K is provided with a notch, the edges of which form an acute angle, into which the cord ends will be jammed and securely held, and to make this holding effect still more positive, the notch may terminate in a small cell or enlargement, into which the cord will be crowded and held by contact with more than one of its sides.

To insure the proper movement of the holding-hook K, it is mounted upon an arm, M, and provided with a hub, $m$, which encircles the shaft B, and therefore its movement is always axially coincident with the shaft B and hook A. The holding-hook is actuated by power applied automatically or otherwise to the lever or arm $n$, which projects from the arm M.

In order that the hook A may be protected from accident, violence, &c., and to insure a proper presentation of the cord, a cover-plate, P, is provided, which is secured to the supporting frame-work in some proper and convenient manner. Across the face of said cover there is a slot, $p$, through which alone the cord may enter to engage with the hook A. At the inner extremity of said slot there are two pins or fingers, E F, which project downward and enter severally the grooves $c\ d$ in the face of the hook A, and act in conjunction with the pin D to arrest the cord during the backward rotation of the hook A, and strip the loop therefrom to form the knot.

Having now described the several parts of which my invention is composed, I will briefly describe the operation of forming the knot therewith. The old end of the core is held in the notch of the holder K and between said holder and the surface of the case L. From the holder the cord passes along the surface of the case J to the notch $g$, and thence it passes through said notch and obliquely through the cover-slot $p$, around the bundle of grain, and back through said notches $p\ g$, side by side. In Fig. 2 only one of the parts of said cord is shown; but it is to be understood that two are present and receive the same treatment in the knotter. When the cord has been thus laid in the knotter the parts of the cord and of the knotter are in what I term the "initial" position. It is shown in Fig. 1. In Fig. 1ª, however, the holder K is shown at the termination of its reciprocation forward from the initial position, ready to receive the new cord to carry it against the cutter $h$. The point of the knotter-hook A is then behind the notch $g$, and as it begins its rotation said point passes above the cord, as shown in position 1, Fig. 12. About this time the hook A begins to draw upon the cord, and simultaneously therewith the holder is caused to move forward from the initial position, so as to slacken or pay out the cord between it and the notch $g$, and thereby the cord from the old end is supplied to form the loop around the hook. The forward movement of the holder continues while the hook continues to draw upon the cord, and then ceases. From the other part of the cord the draft is directly upon the spool or other source of supply. When the hook A has made one-half a rotation the point $a$ passes beneath the cord, as in position 2, Fig. 12. The position of the cord as respects the hook will then be as shown in said figure, entering above the hook, passing down through its bend and around behind its neck G. At the completion of one revolution the point $a$ will have passed again above the cord and the cord will have slipped over the inclined surface $e$, so as to form a turn or bight around the base of the hook. The position of the knotting-hook is then such that the pins D E F are not in their grooves. A further advance of a little more than one-fourth a revolution will bring it to position 3, Fig. 12, when the notch H has passed the cord a second time.

It will be observed that the forward movement of hook A causes the clasp I to swing back or open by the action of the cord, thereby saving the employment of a "clasp-opener," as heretofore used by me. The clasp is opened and held open by the cord until the reverse movement of the hook A brings the ends of the same into the hook H, and the loop which was formed back of the clasp is drawn over said hook, and thereby the ends drawn through and a knot formed. Simultaneously with the reverse movement of knotting-hook A the holding-hook K is caused again to advance, and, taking the spool end of the cord in its notch, it immediately retreats to the initial position and forces the cord across the stationary cutter h, which severs it, so as to release the band from the holder, and at the same time securely fastens the new end in the notch of the holder. During the reverse movement the loop or bight around the base of the hook will encounter the pins D E F, and be prevented from further retreat with the hook, which then begins to escape through said loop. The clasp I encounters the loop as the hook retreats through it and closes forward, so as to cover and bridge the notch H, and the ends of the cord confined therein are thereby carried through the loop and the knot is formed. These effects are successively shown in positions 4, 5, and 6, of Fig. 12. After the discharge of the knot the spool-cord is again carried through the notch g p.

Having described my invention, what I claim as new is—

1. The knotter constructed with its working extension substantially segmental and its reversed hook, as described, the whole operating to lay the loop around it and to receive the part of the twine that is to form the bow by a forward rotary movement, combined with the latch I, situated and pivoted substantially as described, so that the twine first acted upon, or that which is to form the loop, may engage it and carry it backward and shed over it, and thus form behind it, and in the reverse rotation act as a guide to conduct the loop over the bow and reversed hook.

2. The combination of the reversed hook H and the concave ring J, operating as a resistant to the escape of the twine during the stress incident to tying the knot, substantially as set forth.

3. The curved knotting-hook A, provided with one or more circular grooves, b c d, combined with one or more corresponding stationary stripping-pins, D E F, which enter said grooves, for the purpose set forth.

4. The holding-hook K, constructed with a deep notch, the sides whereof form an acute angle, combined with the stationary frame J and the rotary knotting-hook, as set forth.

5. The holding-hook or gripper K, having a rotary reciprocation upon an axis coincident with the axis of the rotary knotter A, combined with said knotter A and the stationary frames J and L.

6. The combination, with the frame J, as an element of the holding mechanism, of the hook K, mounted upon an arm, M, and provided with a hub, m, fitted to the exterior surface of the shaft B, whereby said hook and knotter will move on the same axis.

7. The rotary reciprocating holding-hook or gripper K and rotary knotting-hook A, combined with the stationary knife h, located between said gripper and hook.

8. The rotary knotting-hook A, combined with the gripper K and abutment L, arranged to pay out or let slip so much cord as may be required to form the knot, as set forth.

9. The curved knotting-hook A, to which is imparted a rotary reciprocation, combined with the circular frame J, closely fitting the perimeter of said hook, and provided with recesses i k, as set forth.

10. In a grain-binder, the combination of a rotary knot-tyer and a rotary cord-holder revolving about the same common axis in reverse directions, for the purposes set forth.

11. A stationary stripper or clearer, in combination with a rotary tying-head, made of circular form, and provided with a circumferential groove to receive the end of the clearer, whereby the stationary clearer is enabled to remain in engagement with the cord and to remove the same in a positive manner.

WILLIAM WORTH BURSON.

Witnesses:
ALFRED L. CLARKE,
B. W. KELLY.